US012766610B2

(12) United States Patent
Herud et al.

(10) Patent No.: US 12,766,610 B2
(45) Date of Patent: Oct. 20, 2026

(54) TOOLHOLDER AND CUTTING APPARATUS

(71) Applicant: KENNAMETAL INC., Latrobe, PA (US)

(72) Inventors: Josef Herud, Fuerth (DE); Santhosha Boregowda, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 253 days.

(21) Appl. No.: 18/204,590

(22) Filed: Jun. 1, 2023

(65) Prior Publication Data

US 2023/0390832 A1 Dec. 7, 2023

(30) Foreign Application Priority Data

Jun. 2, 2022 (DE) ........................ 102022114015.6

(51) Int. Cl.
*B23B 31/30* (2006.01)
*B23Q 11/10* (2006.01)

(52) U.S. Cl.
CPC ........ *B23B 31/305* (2013.01); *B23Q 11/1023* (2013.01); *B23B 2231/24* (2013.01); *B23B 2250/12* (2013.01); *B23C 2250/12* (2013.01)

(58) Field of Classification Search
CPC ............... B23B 31/305; B23B 31/1178; B23B 2231/24; B23B 2250/12; B23B 51/06; B23B 51/0682; B23Q 11/1023; Y10T 279/17111; Y10T 279/1241; B23C 2250/12
See application file for complete search history.

(56) References Cited

U.S. PATENT DOCUMENTS 4,213,354 A 7/1980 Dahinden
4,669,933 A * 6/1987 Dye .................... B23Q 1/0036 408/239 R (Continued)

FOREIGN PATENT DOCUMENTS

DE 102017113891 A1 12/2018
DE 102015105047 B4 5/2023

(Continued)

OTHER PUBLICATIONS

Foreign Office Action Chinese Application No. CN202310501563.8, P22-06609-CN-NP, 02 p. .

*Primary Examiner* — Nicole N Ramos
(74) *Attorney, Agent, or Firm* — Christopher J. Owens

(57) ABSTRACT

A toolholder (14) for fastening a chipping tool is specified, having a holding body (22) extending along a holding center axis (20), having a first tool-side end (24) and a second toolholder-side end (26) opposite the first end (24), wherein the holding body (22) comprises at least one coolant supply channel (28) spaced apart from the holding central axis (20), wherein a discharge element (34) is arranged at the second end (26), in which at least one channel-like discharge nozzle (36) is formed, which is fluidly connected to the coolant supply channel (28) and through which coolant can be ejected onto a tool held in the toolholder (14), and wherein a nozzle longitudinal axis (40) extending centrally in the discharge nozzle (36) is inclined to the holding center axis (20) in the radial direction and in the circumferential direction. Furthermore, a cutting apparatus (10) having a toolholder (14) is specified.

19 Claims, 5 Drawing Sheets

(56) References Cited

U.S. PATENT DOCUMENTS

| | | | | | |
|---|---|---|---|---|---|
| 5,275,516 | A * | 1/1994 | Liaw | B23Q 11/1023 279/20 |
| 5,358,360 | A | 10/1994 | Mai | |
| 5,388,487 | A * | 2/1995 | Danielsen | B23Q 11/10 82/158 |
| 5,405,155 | A * | 4/1995 | Kanaan | B23B 31/202 279/157 |
| 6,471,448 | B1 * | 10/2002 | Lagerberg | B23Q 11/10 407/11 |
| 7,134,812 | B2 * | 11/2006 | Beckington | B23Q 1/0036 279/20 |
| 9,434,011 | B2 | 9/2016 | Morrison et al. | |
| 10,160,042 | B2 * | 12/2018 | Borapura | B23B 31/102 |
| 10,252,346 | B2 | 4/2019 | Boregowda et al. | |
| 10,399,150 | B2 * | 9/2019 | Bookheimer | B23B 31/202 |
| 10,576,551 | B1 | 3/2020 | Chen | |
| 2004/0013480 | A1 | 1/2004 | Beckington | |
| 2007/0077132 | A1 * | 4/2007 | Beckington | B23B 31/1075 408/61 |
| 2011/0318123 | A1 * | 12/2011 | Leishman | B23Q 11/10 165/104.19 |
| 2015/0283627 | A1 | 10/2015 | Borapura | |
| 2016/0368064 | A1 | 12/2016 | Boregowda et al. | |
| 2018/0369931 | A1 * | 12/2018 | Boregowda | B23B 31/305 |

FOREIGN PATENT DOCUMENTS

| | | | |
|---|---|---|---|
| WO | 2011138360 | A1 | 11/2011 |
| WO | 2015107101 | A1 | 7/2015 |
| WO | 2021048267 | A1 | 3/2021 |

* cited by examiner

TOOLHOLDER AND CUTTING APPARATUS

RELATED APPLICATION DATA

The present application claims priority under 35 U.S.C. § 119(a) to German Application No. 102022114015.6, filed on Jun. 2, 2022 and is incorporated by reference herein in its entirety.

FIELD

The invention relates to a toolholder for fastening a chipping tool and a cutting apparatus having a toolholder. The toolholder is, for example, an adapting sleeve, a shrink retainer, a chuck, or the like.

BACKGROUND

From the prior art, toolholders are known that are used in cutting apparatuses in order to hold, for example, a cutting tool such as an end mill or a drill.

In order to cool the inserted cutting tool, it is known from the prior art that the toolholder itself can comprise structures with which coolant is transported to the cutting tool. The structures can be coolant lines formed in the toolholder and having respective discharge nozzles on a front face that are aligned with the cutting end of the cutting tool. In the operation of the cutting apparatus, the coolant exits via the discharge nozzles accordingly and falls on the cutting tool so that it is cooled during the operation.

However, in the known solutions, only a small proportion of the coolant directly hits the cutting tool, thereby making the cooling of the cutting tool less efficient.

It is therefore a problem addressed by the invention to provide a toolholder that allows for an efficient cooling of the cutting tool used.

SUMMARY

According to the present invention, this problem is solved by means of a toolholder for fastening a chipping tool, having a holding body extending along a holding central axis, which has a first tool-side end and a second toolholder-side end opposite the first end. The holding body comprises at least one coolant supply channel that is spaced apart from the holding central axis, wherein a discharge element is arranged at the second end in which at least one channel-like discharge nozzle is formed, which is fluidly connected to the coolant supply channel and through which coolant can be ejected onto a tool held in the toolholder. A nozzle longitudinal axis extending centrally in the discharge nozzle is inclined to the holding center axis in the radial direction and in the circumferential direction.

With discharge nozzles that are inclined in this way, the advantage is achieved that the coolant flow is aligned and accelerated such that the acceleration acting on the coolant flow counteracts the centrifugal forces prevailing during operation, which arise during the rotation of a cutting apparatus. In this way, a high proportion of coolant directly strikes the cutting tool, so that it is particularly efficiently cooled.

In particular, with the toolholder according to the invention, a particularly good result is achieved with respect to flow rate, discharge behavior, flow rigidity, and flow pattern of the coolant.

The advantages mentioned are achieved in particular at speeds of between 3,000 and 15,000 revolutions per minute and in a pressure range of 10 bar to 50 bar.

The inclination in the radial direction is in particular such that a leaking coolant flow is directed radially inward.

For example, the inclination in the radial direction and/or in the circumferential direction is between 3° and 30°, in particular between 6° and 15°. At such angles, the coolant exiting the discharge nozzles at least largely flows along a shaft of a cutting tool inserted in the toolholder up to the cutting edges.

In one exemplary embodiment, the inclination in the radial direction is 8° and in the circumferential direction is 15°.

For example, the inclination is greater in the circumferential direction than in the radial direction. As a result, the acceleration of the coolant flow is particularly effective in countering the arising centrifugal forces.

According to one embodiment, a plurality of discharge nozzles are distributed in the circumferential direction, wherein the discharge nozzles are inclined differently in the radial direction and/or in the circumferential direction. This means that at least one discharge nozzle has a different inclination in the radial direction and/or in the circumferential direction than the remaining discharge nozzles. As a result, the inclinations of individual discharge nozzles can be optimized for a certain operating state, i.e., for a certain speed or fluid pressure. In this way, it is achieved that at least one optimally aligned discharge nozzle can respectively be present for different, defined operating states.

Preferably, the at least one discharge nozzle tapers towards the outlet. The taper increases the flow rate of the coolant, which is advantageous in terms of the discharge behavior of the coolant out of the discharge nozzle.

Preferably, the discharge nozzles are inclined clockwise in the circumferential direction in a side view when viewed in the direction of the outlet. Such an inclination is particularly advantageous in that the acceleration acting on the exiting coolant counteracts the centrifugal force. The stated advantage is achieved under the assumption that the cutting apparatus used, in which the toolholder is inserted, is a standard, right-hand rotating apparatus.

The at least one coolant supply channel can extend at least in sections inside the holding body or can be configured at least in sections as a groove that extends on an outer circumference of the holding body, or is configured at least in sections as a slot. In the first case, the coolant supply channel is thus embedded at least in sections in the holding body in such a way that it is circumferentially closed. In the second case, the coolant supply channel is radially open at least in sections and is completed, i.e., closed, by an associated wall of the one toolholder in which the toolholder is held [sic: of the toolholder in which the tool is held]. In the case of a slot, the coolant supply channel is closed by an associated wall of the toolholder and the inserted cutting tool. All variants make it possible to reliably introduce coolant into a chipping zone or to conduct it to the chipping zone.

In the case of a slot, the advantage is also achieved that the flexibility of the toolholder is increased so that the toolholder can be adjusted in the radial direction. This is particularly advantageous when the toolholder is an adapting sleeve held in an expansion chuck. As a result, via the expansion chuck and the interposed adapting sleeve, a clamping force can be applied to a cutting tool inserted into the adapting sleeve without damaging the adapting sleeve.

Provided that the at least one coolant supply channel extends inside the holding body or is configured as a groove, additional slots can be provided as needed in order to increase the flexibility of the toolholder.

A coolant supply channel in the form of a slot is also advantageous for thin wall thicknesses of the toolholder, for which a closed channel or groove is difficult to manufacture.

The coolant supply channel can comprise a cooling manifold section, via which the coolant is distributed to a plurality of discharge nozzles, wherein at least two channel-like discharge nozzles are associated with the cooling manifold section, in particular wherein the cooling manifold section extends only over a partial region of the circumference of the body. With the cooling manifold section, it is possible for a plurality of discharge nozzles to be supplied by a common coolant supply channel, because the coolant flowing through the coolant supply channel is distributed via the cooling manifold section to the discharge nozzles associated with the cooling manifold section. For example, three discharge nozzles are provided per coolant supply channel, which are supplied with coolant via the cooling manifold section. Due to the fact that a plurality of discharge nozzles are fluidly connected to a coolant supply channel by means of the cooling manifold section, the number of coolant supply channels required is reduced, and thus the manufacturing costs are reduced. In other words, a sufficiently large volumetric flow of coolant can be output via the coolant manifold sections having few cooling channels.

The toolholder is preferably manufactured by an additive manufacturing process, in particular by a three-dimensional printing process.

The problem is further solved according to the invention by a cutting apparatus having a toolholder according to the invention, wherein the cutting apparatus comprises an expansion chuck with a holding section in which the toolholder, in particular an adapting sleeve, is inserted. As already described in connection with the toolholder, a particularly efficient cooling of a cutting tool inserted into the toolholder is achieved by means of the cutting apparatus according to the invention.

DESCRIPTION OF THE DRAWINGS

Further advantages and features of the invention result from the following description and from the accompanying drawings, to which reference is made. The drawings show.

DETAILED DESCRIPTION

Figure 1:
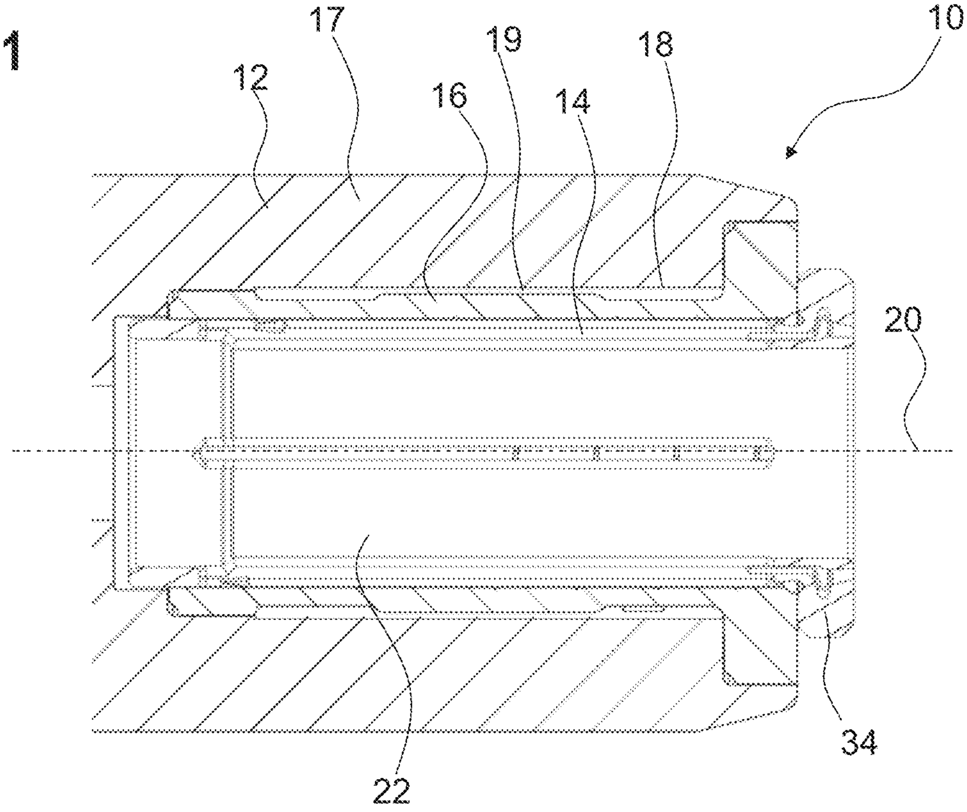
FIG. 1 a cutting apparatus according to the invention having a toolholder according to the invention in a sectional view, FIG. 2 the toolholder from FIG. 1 in a perspective view, FIG. 3 a sectional view of the toolholder of FIG. 1.

FIG. 1 illustrates a cutting apparatus 10 in a sectional view. The cutting apparatus 10 has an expansion chuck 12 and a toolholder 14, which in the exemplary embodiment is an adapting sleeve. However, the toolholder 14 can also be a shrink holder, an expansion chuck holder, an expansion chuck itself, or the like.

The expansion chuck 12 comprises an expansion bushing 16, which is inserted into a holding section 18 of a base body 17.

The expansion bushing 16 is in particular connected to the base body 17, in particular soldered, such that an outwardly sealed pressure chamber 19 results.

By increasing the fluid pressure in the pressure chamber 19, the walls of the expansion bushing 16 bulge inwardly in order to fasten a cutting tool.

Figure 3:
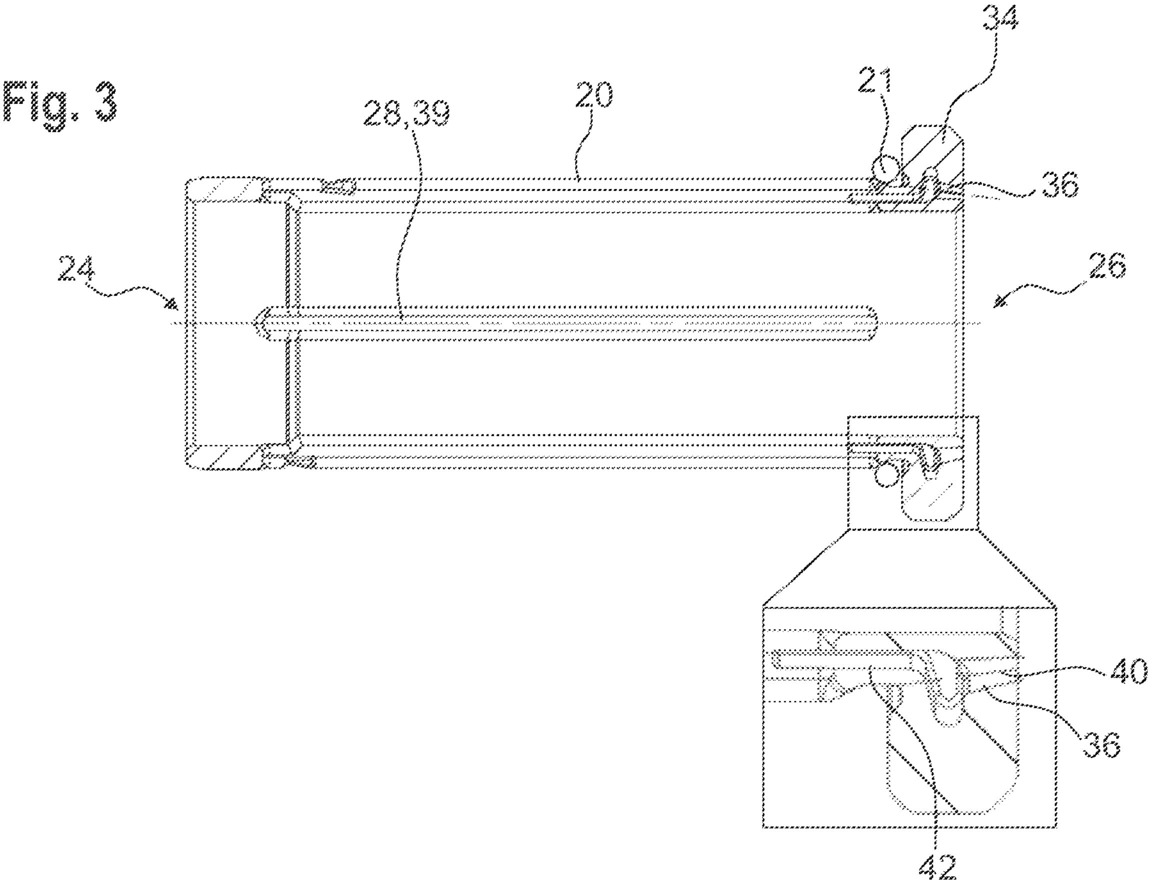

A sealing ring 21 can optionally be arranged between the toolholder 14 and the bushing 16 (see FIG. 3).

Figure 2:
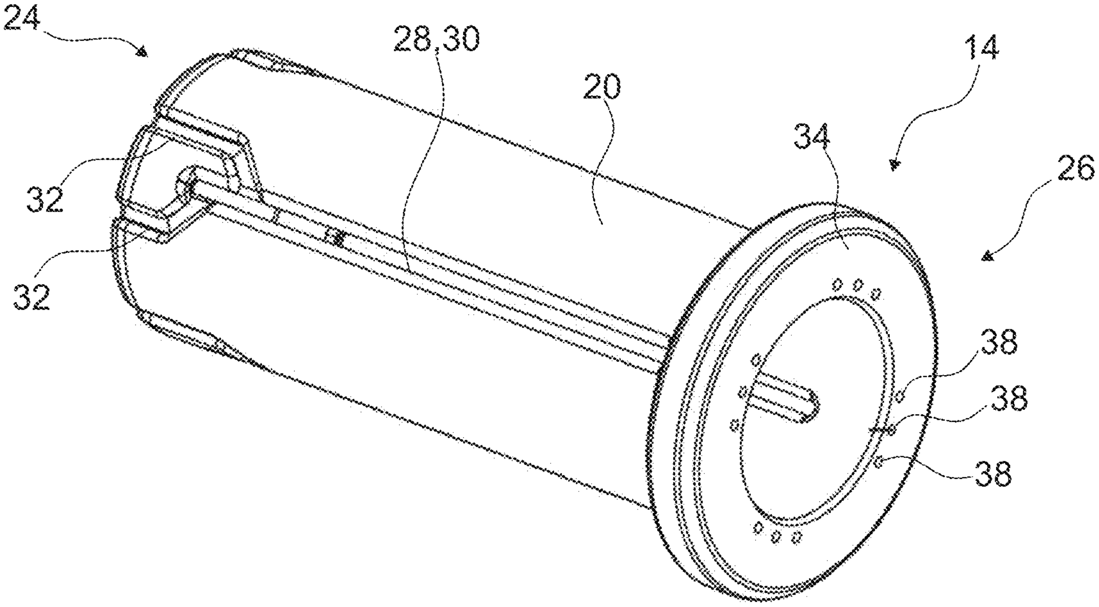

A cutting tool such as a drill or an end mill can be held in the toolholder 14, which is shown in FIGS. 2 and 3 in a perspective view or in a sectional view.

The toolholder 14 in the exemplary embodiment is used in order to reduce the effective diameter for holding the cutting tool.

The toolholder 14 has a holding body 22 extending along a holding center axis 20.

The holding body 22 is preferably configured in one piece and made, for example, by a three-dimensional printing process.

The holding body 22 has a first end 24, which is a tool-side end in the clamped state of the toolholder 14, and a second end 26, which is opposite the first end and is a toolholder-side end in the clamped state of the toolholder 14.

The holding body 22 has at least one, and in the exemplary embodiment four, coolant supply channels 28 spaced apart from the holding central axis 20.

In the exemplary embodiment, the coolant supply channels 28 are largely configured as slots 30.

A section of the coolant supply channels 28, in particular an inlet section abutting the first end 24, are respectively configured as a groove 32 that extends on an outer circumference of the holding body 22.

In the exemplary embodiment, two grooves 32 extend into a slot 30.

Due to the fact that the inlet section of the coolant supply channels 28 is configured as a groove, the toolholder 14 is closed at the first end 24, i.e., not interrupted by the slots 30. This ensures a sufficient stability of the toolholder 14 as well as an accurate fit in the expansion chuck 12.

In an alternative embodiment, not shown for the sake of simplicity, the coolant supply channels 28 can respectively be formed entirely as grooves 32.

In a further alternative, the coolant supply channels 28 can extend inside the holding body 22.

When the toolholder 14 is held in an expansion chuck 12 as shown in FIG. 1, and a cutting tool is additionally inserted in the toolholder 14, the coolant supply channels 28 are circumferentially closed.

A discharge element 34 is arranged at the second 26 end of the holding body 22. The discharge element 34 is in particular integrally formed with the holding body 22.

The discharge element 34 has the shape of a circumferential collar and also serves as an axial stop when inserting the toolholder 14 into the cutting apparatus 10. In other words, the discharge element 34 is a disc-shaped end section of the toolholder 14 having an enlarged diameter in relation to the cylindrical holding body 22.

In the discharge element 34, a plurality of channel-like discharge nozzles 36 are formed and are fluidly connected to one of the coolant supply channels 28.

Coolant can be ejected from a cutting tool held in the toolholder 14 through the discharge nozzles 36.

In FIG. 2, the discharge openings 38 of the discharge nozzles 36 are visible at the front face of the discharge element 34. As a result, the number and arrangement of the discharge nozzles 36 can also be seen.

In the exemplary embodiment, there are twelve discharge nozzles 36 that are circumferentially distributed, wherein the distance between the discharge nozzles 36 varies, and three discharge nozzles 36 are associated with a common coolant supply channel 28, which is explained in further detail below.

In FIG. 3, in particular in the detailed view, it can be seen that a nozzle longitudinal axis 40 extending centrally in the discharge nozzle 36 is inclined in the radial direction towards the holding center axis 20, namely such that a discharging coolant flow is directed radially inward.

The inclination in the radial direction is between 3° and 30°, in the exemplary embodiment 8°.

Figure 4:
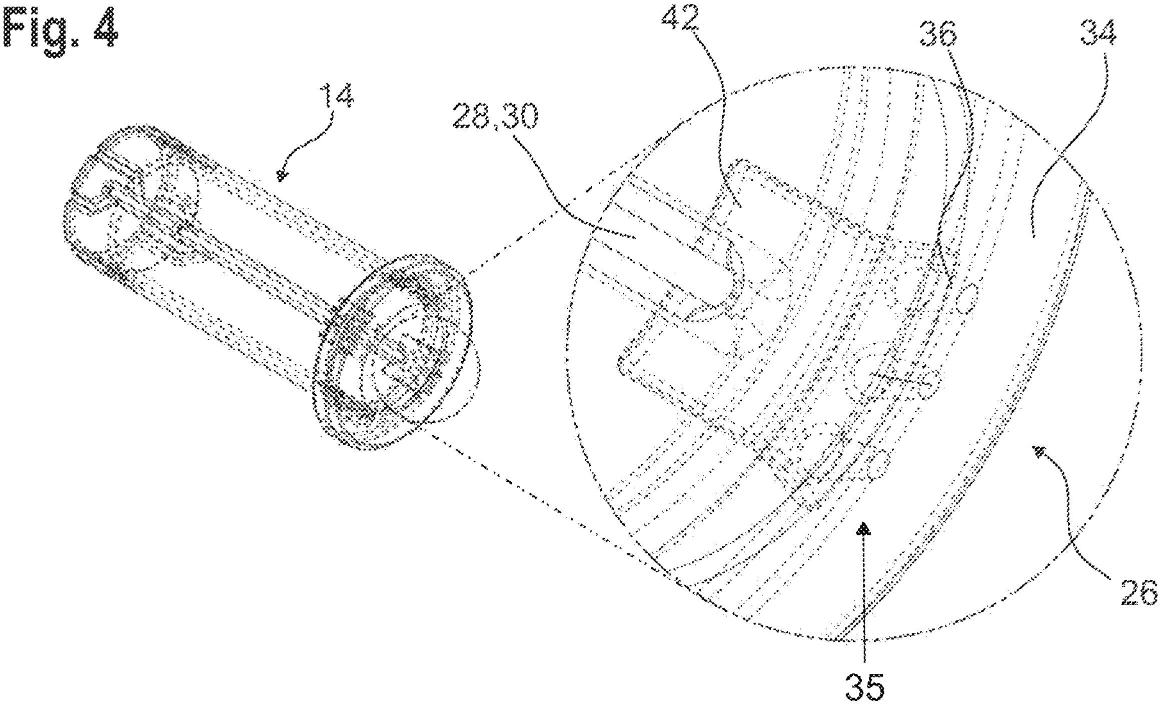
FIG. 4 is a toolholder-side end of the toolholder, FIG. 5 a path of coolant supply channels present in the toolholder.

FIG. 4 shows in the detailed view a toolholder-side end 26 of toolholder 14 in a perspective view, wherein the walls of toolholder 14 are transparently illustrated in order to allow for a view of the discharge nozzles 36.

It can be seen from FIG. 4 that the nozzle longitudinal axes 40 are not only inclined in the radial direction, but also in the circumferential direction.

The inclination in the circumferential direction can also be between 3° and 30°. In the exemplary embodiment, the inclination in the circumferential direction is 15°.

The inclination in the circumferential direction is thus greater than in the radial direction.

The discharge nozzles 36 are inclined clockwise in the circumferential direction in a side view when viewed in the direction of the outlet. In other words, the discharge nozzles are inclined in the circumferential direction counter to the centrifugal force arising during operation.

The discharge nozzles 36 are conical in shape and taper towards the outlet.

It can also be seen in FIG. 4 that each coolant supply channel 28 comprises a cooling manifold section 42 through which the coolant is distributed to a plurality of discharge nozzles 36, wherein three channel-like discharge nozzles 36 are associated with the cooling manifold section 42 in the exemplary embodiment.

As shown in FIG. 4, the discharge element 34 has a plurality of discharge units 35 formed therein. In the exemplary embodiment, there are four discharge units 35. Each discharge unit 35 has a plurality of discharge nozzles 36. In the exemplary embodiment, each discharge unit 35 has three discharge nozzles 36. As shown in FIG. 4, the plurality of discharge nozzles 36 of one discharge unit 35 are fluidly connected to one coolant supply channel 28. Each discharge unit 35 is distributed circumferentially around the holding center axis 20.

The cooling manifold section 42 extends only over a partial region of the circumference of the holding body 22.

Figure 5:
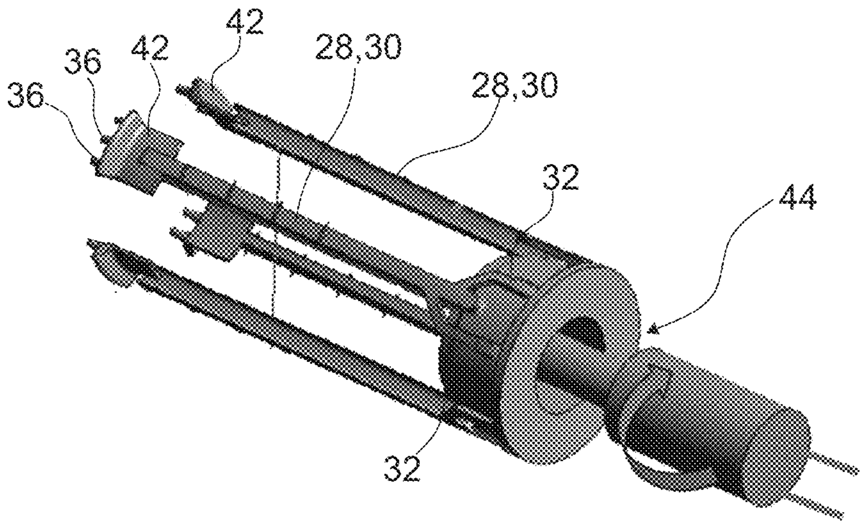

The arrangement and shape of the cooling manifold section 42 is also particularly clearly visible in FIG. 5, in which the coolant supply channels 28 are shown with the cooling manifold sections 42 and the discharge nozzles 36 as an impression.

In addition, a coolant inlet 44 is illustrated in FIG. 5, also as an impression.

Various operating states during the operation of the cutting apparatus 10 are illustrated in FIGS. 6 to 8, wherein a part of a tool shaft 46 of a cutting tool inserted in the toolholder 14 as well as a flow path of the coolant outside the toolholder 14 for various operating conditions are respectively illustrated in FIGS. 6 to 8.

FIGS. 6*a* to 6*d* illustrate a respective operating state in which coolant is supplied to the toolholder 14 at a fluid pressure of 10 bar.

The states illustrated in FIGS. 6*a* to 6*d* differ in their speed. More specifically, in FIG. 6*a*, a state at a speed of 3000 revolutions per minute is illustrated, in FIG. 6*b* a state at a speed of 7000 revolutions per minute, in FIG. 6*c* a state at a speed of 10,000 revolutions per minute, and in FIG. 6*d* a state at 15,000 revolutions per minute.

FIGS. 7*a* to 7*d* illustrate a respective state at a fluid pressure of the supplied coolant of 30 bar for the same speeds.

FIGS. 8*a* to 8*d* illustrate a respective state at a fluid pressure of the supplied coolant of 50 bar.

It can be seen from the illustrations of FIGS. 6 to 8 that a particularly advantageous flow path of the coolant outside of the toolholder 14 is achieved by means of the path of the discharge nozzles 36 according to the invention, in which the coolant flows along the shaft 46 of the cutting tool used and thus a reliable cooling of the cutting tool occurs.

Figure 6A:
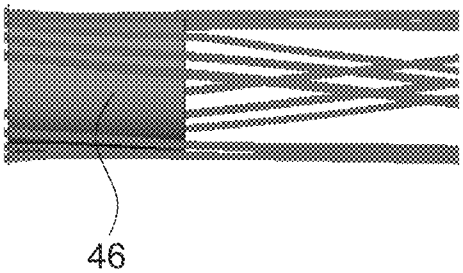
FIGS. 6*a* to 6*d* show a path of a coolant flow after being discharged from the toolholder for various speeds at a fluid pressure of 10 bar.
Figure 6B:
Figure 6C:
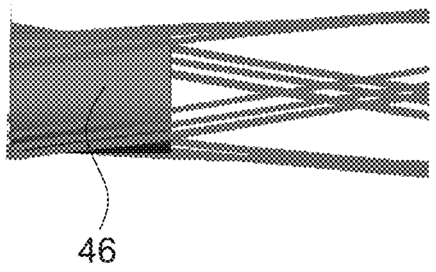
Figure 6D:
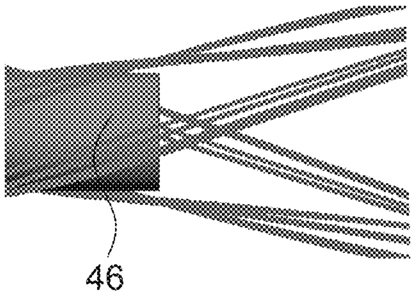
Figure 7A:
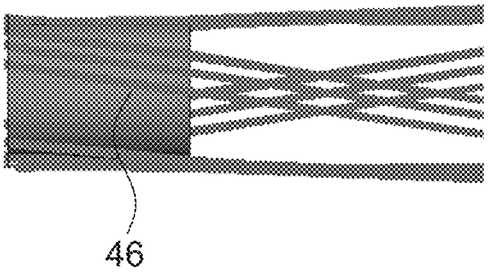
FIGS. 7*a* to 7*d* show a path of a coolant flow after being discharged from the toolholder for various speeds at a fluid pressure of 30 bar.
Figure 7B:
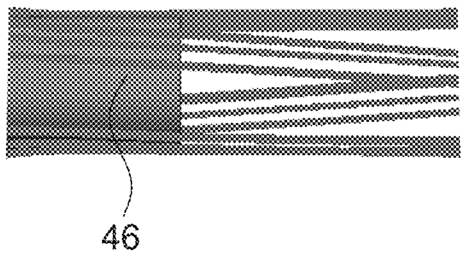
Figure 7C:
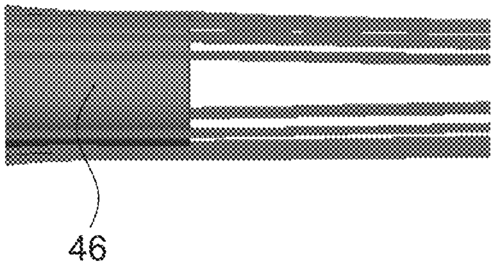
Figure 7D:
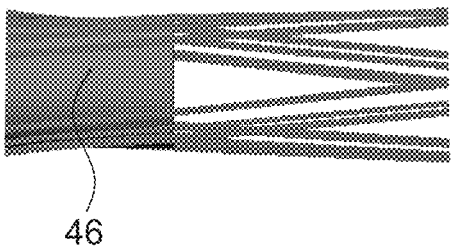
Figure 8A:
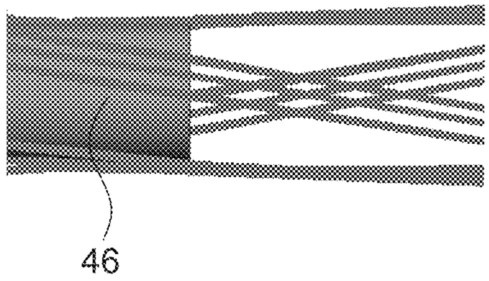
FIGS. 8*a* to 8*d* show a path of a coolant flow after being discharged from the toolholder for various speeds at a fluid pressure of 50 bar.
Figure 8B:
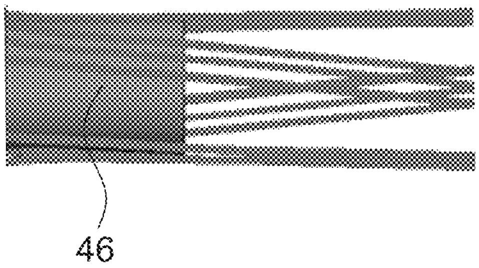
Figure 8C:
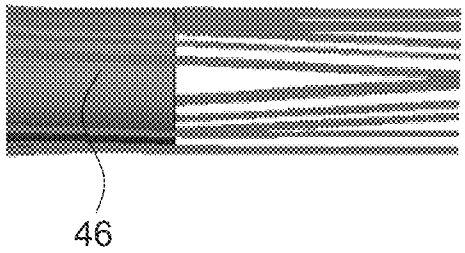
Figure 8D:
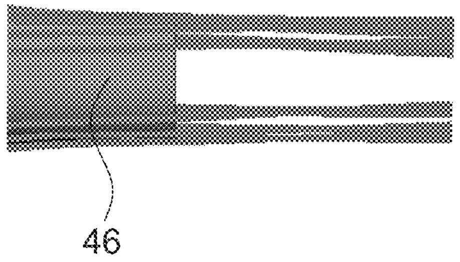

Only at relatively low pressure and very high speeds does a significant diversification of the coolant occur due to the centrifugal forces prevailing during operation, as can be seen in FIG. 6*d*. This is due to the relatively low flow rigidity of the coolant at relatively low pressure.

In the illustrated embodiment, all discharge nozzles 36 have the same inclination, in the radial direction as well as in the circumferential direction.

However, it is also contemplated that some discharge nozzles 36 will vary in their inclination in the radial direction and/or in the circumferential direction. Thus, different discharge nozzles 36 can be optimized for different operating conditions, in particular for different speeds and different fluid pressures.

For example, it is contemplated to provide at least one discharge nozzle 36 with a greater inclination in order to improve the cooling at low pressure and high speeds.

The invention claimed is:

1. A toolholder, comprising:

a holding body extending along a holding center axis, the holding body has a first end and a second end opposite the first end, and a plurality of coolant supply channels each spaced apart from the holding center axis; and a discharge element arranged at the second end and having a plurality of discharge units formed therein, each discharge unit includes a plurality of discharge nozzles, the plurality of discharge nozzles of one discharge unit are fluidly connected to one coolant supply channel, such that a coolant is ejected through each discharge nozzle onto a tool held in the toolholder, at least one coolant supply channel is configured at least in one section as a slot, the slot extends through the holding body and is defined by a pair of walls of the holding body opposite each other, each discharge nozzle has a nozzle longitudinal axis extending centrally through the discharge nozzle, the nozzle longitudinal axis being angularly offset from the holding center axis about two non-parallel axes, the angular offset comprising a first angular component in a radial plane of the discharge element and a second angular component in a circumferential plane of the discharge element.

2. The toolholder according to claim 1, wherein offsetting of the nozzle longitudinal axis in the radial plane and/or circumferential plane is between 6° and 15°.

3. The toolholder of claim 1, wherein the nozzle longitudinal axis is offset into the circumferential plane more than into the radial plane.

4. The toolholder according to claim 1, wherein offsetting of the nozzle longitudinal axis in the radial plane and/or in the circumferential plane is between 3° and 30°.

5. The toolholder of claim 1, wherein the discharge nozzles are offset differently in the radial plane and/or in the circumferential plane.

6. The toolholder according to claim 1, wherein at least one discharge nozzle tapers towards an outlet.

7. The toolholder according to claim 1, wherein at least one coolant supply channel extends at least in sections inside the holding body.

8. The toolholder according to claim 1, wherein the at least one coolant supply channel is also configured in at least one other section as a groove that extends on an outer circumference of the holding body, the groove extends partially into the holding body.

9. The toolholder according to claim 1, wherein each coolant supply channel comprises a cooling manifold section, via which the coolant is distributed to the plurality of discharge nozzles of one discharge unit.

10. The toolholder according to claim 9, wherein each cooling manifold section extends only over a partial region of a circumference of the holding body.

11. A cutting apparatus having a toolholder according to claim 1, wherein the cutting apparatus comprises an expansion chuck having a holding section into which the toolholder is inserted.

12. The toolholder according to claim 1, wherein the toolholder fastens a chipping tool.

13. The toolholder according to claim 9, wherein at least one cooling manifold section extends only over a partial region of a circumference of the holding body.

14. The toolholder according to claim 1, wherein each discharge unit is distributed circumferentially around the holding center axis.

15. A toolholder, comprising:

a holding body extending along a holding center axis, the holding body has a first end and a second end opposite the first end, and a plurality of coolant supply channels each spaced apart from the holding center axis; and a discharge element arranged at the second end and having a plurality of discharge units formed therein, each discharge unit includes a plurality of discharge nozzles, the plurality of discharge nozzles of one discharge unit are fluidly connected to one coolant supply channel, such that a coolant is ejected through each discharge nozzle onto a tool held in the toolholder, at least one coolant supply channel is configured at least in one section as a groove that extends on an outer circumference of the holding body and in at least one other section as a slot, the groove extends partially into the holding body, the slot extends through the holding body and is defined by a pair of walls of the holding body opposite each other.

16. The toolholder according to claim 15, wherein the at least one coolant supply channel is configured at least in two sections as grooves that each extend on an outer circumference of the holding body, the two grooves each extend into the slot of the at least one other section.

17. A toolholder, comprising:

a holding body extending along a holding center axis, the holding body has a first end and a second end opposite the first end, and a plurality of coolant supply channels each spaced apart from the holding center axis; and a discharge element arranged at the second end and having a plurality of discharge units formed therein, each discharge unit includes a plurality of discharge nozzles, the plurality of discharge nozzles of one discharge unit are fluidly connected to one coolant supply channel, such that a coolant is ejected through each discharge nozzle onto a tool held in the toolholder, at least one coolant supply channel is configured at least in sections as a slot, the slot extends through the holding body and is defined by a pair of walls of the holding body opposite each other.

18. The toolholder of claim 6, wherein the taper results in the outlet having a smaller cross-sectional area than an inlet.

19. The toolholder according to claim 1, wherein the first angular component is a rotation of the nozzle longitudinal axis about a first axis lying in the radial plane of the discharge element, and the second angular component is a rotation of the nozzle longitudinal axis about a second axis lying in the circumferential plane of the discharge element, the first and second axes being orthogonal to one another.

* * * * *